(12) United States Patent   (10) Patent No.:   US 12,691,744 B2
Kobayashi et al.   (45) Date of Patent:   Jul. 28, 2026

(54) VEHICLE

(71) Applicant: TOYOTA JIDOSHA KABUSHIKI KAISHA, Toyota (JP)

(72) Inventors: Jun Kobayashi, Obu (JP); Takahiro Okano, Chiryu (JP); Mitsuyoshi Ohno, Miyoshi (JP); Nobuhiro Nakano, Nagakute (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 288 days.

(21) Appl. No.: 18/538,203

(22) Filed: Dec. 13, 2023

(65) Prior Publication Data

US 2024/0208318 A1   Jun. 27, 2024

(30) Foreign Application Priority Data

Dec. 27, 2022   (JP) ................................. 2022-210090

(51) Int. Cl.
   *B60K 1/04*   (2019.01)
   *B60L 50/64*   (2019.01)
(52) U.S. Cl.
   CPC ................ *B60K 1/04* (2013.01); *B60L 50/64* (2019.02); *B60K 2001/0438* (2013.01); *B60K 2001/0455* (2013.01)

(58) Field of Classification Search
   CPC .............. B60K 1/04; B60K 2001/0438; B60K 2001/0433; B60K 2001/0455; B60K 2001/0461; B60K 2001/0472; B60L 50/64; B60L 50/80; H01M 50/249; H01M 50/264
   See application file for complete search history.

(56) References Cited

U.S. PATENT DOCUMENTS 6,631,775 B1 * 10/2003 Chaney ................... B60L 53/80
                                                          280/783

FOREIGN PATENT DOCUMENTS

JP       H0424275   U   *   2/1992
JP       2012192782 A   *   10/2012
JP       2013139207 A   *   7/2013

OTHER PUBLICATIONS

Mechanical translation of JP-2012192782-A, Oct. 11, 2012.*
Mechanical translation of JP-2013139207-A, Jul. 18, 2013.*
Mechanical translation of JP-H0424275-U, Feb. 27, 1992.*

* cited by examiner

*Primary Examiner* — John D Walters
(74) *Attorney, Agent, or Firm* — Dinsmore & Shohl LLP

(57)   ABSTRACT

A vehicle includes a vehicle body and a battery attachable to and detachable from the vehicle body. The battery includes a battery-side connector and a cover that protects the battery-side connector. The vehicle body includes a vehicle body-side connector electrically connectable to the battery-side connector. The cover exposes the battery-side connector when the battery-side connector is fit to the vehicle body-side connector in a fitting direction in which the vehicle body-side connector and the battery-side connector are fit to each other.

2 Claims, 2 Drawing Sheets

VEHICLE

CROSS-REFERENCE TO RELATED APPLICATIONS

This nonprovisional application is based on Japanese Patent Application No. 2022-210090 filed on Dec. 27, 2022 with the Japan Patent Office, the entire contents of which are hereby incorporated by reference.

BACKGROUND

Field

The present disclosure relates to a vehicle.

Description of the Background Art

Conventionally, a vehicle in which a battery can be replaced is known, for example, Japanese Patent Laying-Open No. 2012-192782 discloses that a lower portion of a vehicle body is provided with a portion where a battery is mounted, and the battery is replaced from below the vehicle body.

SUMMARY

In the battery electric vehicle described in Japanese Patent Laying-Open No. 2012-192782, when a connector of a battery is exposed to the outside for replacement of the battery, foreign matter may adhere to the connector.

It is an object of the present disclosure to provide a vehicle in which adhesion of foreign matter to a battery-side connector can be suppressed.

A vehicle according to one aspect of the present disclosure includes: a vehicle body on which a battery is mountable; and the battery attachable to and detachable from the vehicle body, wherein the battery includes: a battery-side connector; and a cover that protects the battery-side connector, the vehicle body includes a vehicle body-side connector electrically connectable to the battery-side connector, and the cover exposes the battery-side connector when the battery-side connector is fit to the vehicle body-side connector in a fitting direction in which the vehicle body-side connector and the battery-side connector are fit to each other.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figures 1, 2:
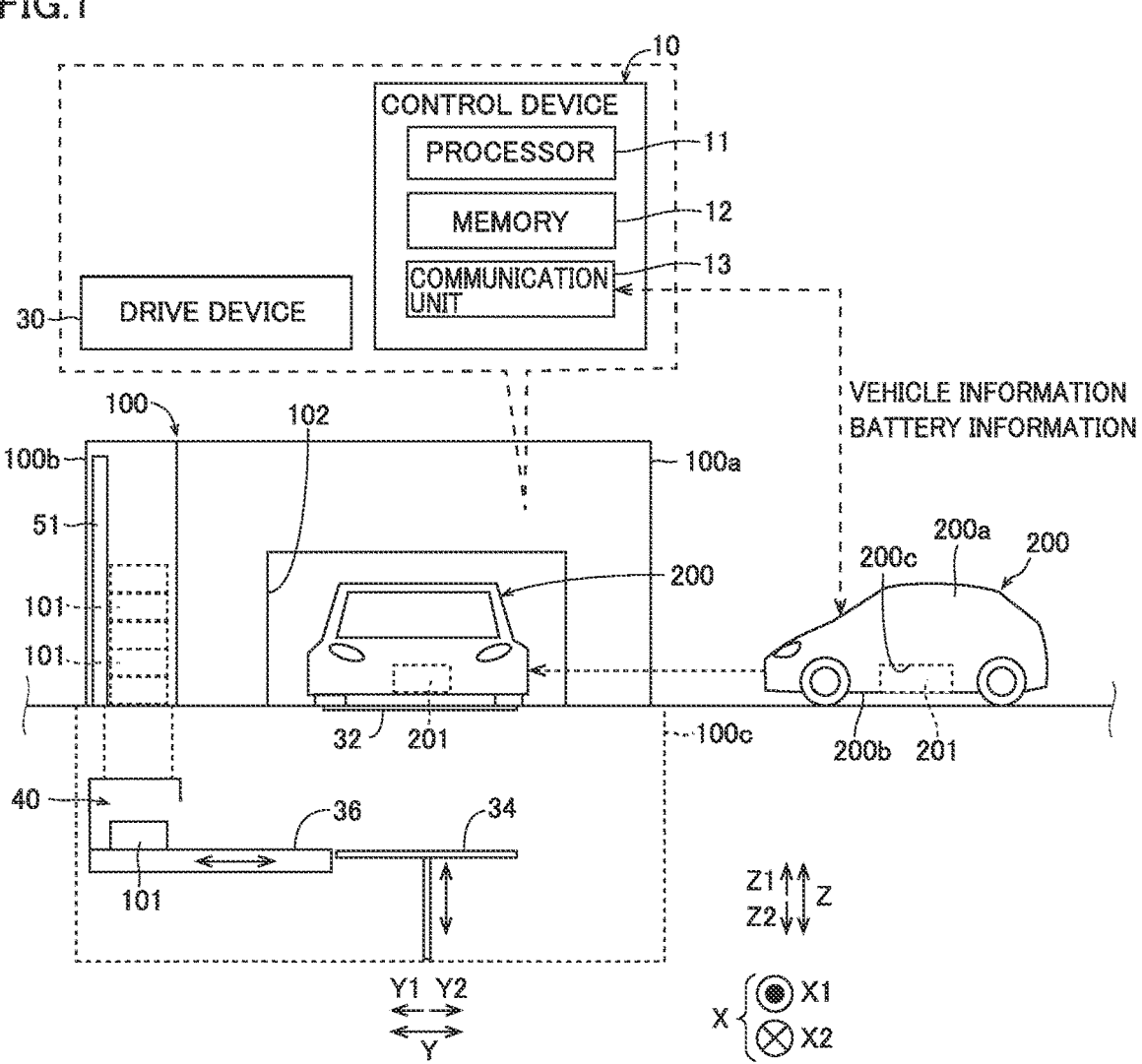
FIG. 1 schematically shows a battery replacement apparatus according to an embodiment of the present disclosure.
FIG. 2 is a perspective view schematically showing a configuration of a battery.

Hereinafter, embodiments of the present disclosure will be described in detail with reference to the accompanying drawings. In the drawings, the same or corresponding parts are denoted by the same reference numerals, and the description thereof will not be repeated.

FIG. 1 is a diagram showing a battery replacement apparatus 100 and an electrically powered vehicle 200 according to the present embodiment. The battery replacement apparatus 100 is an apparatus for replacing a battery (used battery) 201 attached to the electrically powered vehicle 200 with a charged battery (new battery) 101. The battery 201 and the battery 101 are examples of "first battery" and "second battery" of the present disclosure, respectively.

(Configuration of Electrically Powered Vehicle)

As shown in FIG. 1, the vehicle body 200a of the electrically powered vehicle 200 has a mounting portion 200c on which the batteries 101 and 201 can be mounted. The mounting portion 200c opens downward. The mounting portion 200c has a shape recessed upward from the lower surface 200b of the vehicle body 200a. The batteries 101 and 201 are attachable to and detachable from the mounting portion 200c. Specifically, the batteries 101 and 201 are fastened to the mounting portion 200c by fastening members such as bolts.

Figure 3:
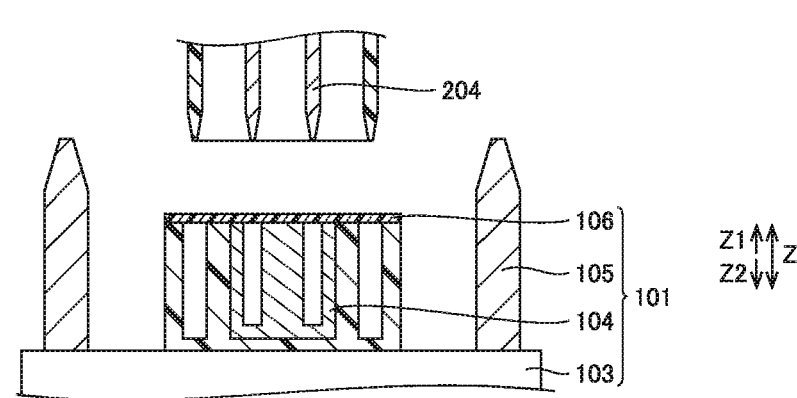
FIG. 3 is a cross-sectional view schematically showing a battery-side connector and a vehicle body-side connector.

Next, the configuration of the battery will be described with reference to FIGS. 2 and 3. Hereinafter, the charged battery 101 will be described as an example. As shown in FIG. 2, the battery 101 includes a battery body 103, a battery-side connector 104, a pair of fitting pins 105, and a cover 106.

The battery-side connector 104 projects upward from the battery body 103. The battery-side connector 104 can be connected to a vehicle body-side connector 204 (see FIG. 3). The battery-side connector 104 is configured by a female terminal.

The pair of fitting pins 105 project upward from the battery body 103. The pair of fitting pins 105 is disposed on the side of the battery-side connector 104.

The cover 106 protects the battery-side connector 104. The cover 106 is made of an insulating material such as synthetic resin. The cover 106 exposes the battery-side connector 104 when the battery-side connector 104 is fit to the vehicle body-side connector 204 in a fitting direction (vertical direction in FIG. 3) in which the vehicle body-side connector 204 and the battery-side connector 104 are fit to each other. In the present embodiment, the cover 106 includes a sheet that covers the surface of the battery-side connector 104. The cover 106 may be bonded to the surface of the housing of the battery-side connector 104.

The mounting portion 200c is provided with a vehicle body-side connector 204 (see FIG. 3) to be engaged with the battery-side connector 104. The vehicle body-side connector 204 includes male terminals. The vehicle body-side connector 204 penetrates the cover 106 when the vehicle body-side connector 204 is fit to the battery-side connector 104. Thus, the battery-side connector 104 is exposed.

(Configuration of Battery Replacement Apparatus)

Next, the battery replacement apparatus 100 will be described. As shown in FIG. 1, the battery replacement apparatus 100 includes a battery replacement station 100a, a storage 100b, and an underfloor area 100c.

The battery replacement station 100a is a station in which the battery 201 is detached from the electrically powered vehicle 200 and the battery 101 is attached to the electrically powered vehicle 200. The battery replacement station 100a is provided with an entrance/exit 102 for the electrically powered vehicle 200 to enter/exit.

The storage 100b stores the charged battery 101. The storage 100b is provided in parallel with the battery replacement station 100*a*. A charging facility 51 capable of charging the battery 201 removed from the electrically powered vehicle 200 is provided in the storage 100*b*. The battery 201 is charged by the charging facility 51 in the storage 100*b*. The battery 101 charged in the storage 100*b*, i.e., the charged battery 101, is conveyed to the electrically powered vehicle 200 after the cover 106 is attached to the battery-side connector 104 and moved to a temporary placement site 40 provided in the underfloor area 100*c*.

The underfloor area 100*c* is provided below the battery replacement station 100*a* and the storage 100*b*. The underfloor area 100*c* is provided with a battery mounting table 34, a raising/lowering unit, a transport unit 36, and a temporary placement site 40, which will be described later.

The battery replacement apparatus 100 includes a control device 10 and a drive device 30.

The control device 10 includes a processor 11, a memory 12, and a communication unit 13. The memory 12 stores, in addition to a program executed by the processor 11, information (e.g., map, formula, and various parameters) used by the program. As will be described in detail later, the processor 11 controls the drive device 30.

The communication unit 13 includes various communication I/Fs. The processor 11 controls the communication unit 13. The communication unit 13 communicates with a DCM or the like of the electrically powered vehicle 200. The communication unit 13 and the electrically powered vehicle 200 can perform bidirectional communication. The communication unit 13 may communicate with a mobile terminal or the like possessed by the user of the electrically powered vehicle 200.

The battery replacement station 100*a* is provided with a vehicle stop area (not shown). When the user performs an operation for instructing the start of the battery replacement operation in a navigation system (not shown) of the electrically powered vehicle 200 in a state where the electrically powered vehicle 200 is stopped in the vehicle stop area, the communication unit 13 receives an instruction signal for starting the battery replacement operation from the electrically powered vehicle 200. The processor 11 starts the control of the battery replacement operation based on the reception of the instruction signal by the communication unit 13. The electrically powered vehicle 200 stops in the vehicle stop area such that the front-rear direction is the X direction and the left-right direction is the Y direction.

The drive device 30 includes a shutter 32, a battery mounting table 34, and a transport unit 36.

The shutter 32 is provided in the vehicle stop area. The shutter 32 is configured to be able to open and close an opening formed in a floor surface of the vehicle stop area. The shutter 32 can be switched between a state in which the opening is opened and a state in which the opening is closed.

The battery mounting table 34 is disposed below the battery replacement station 100*a*, more specifically, below the opening of the shutter 32. The battery mounting table 34 can mount the batteries 101 and 201 and can move in the vertical direction.

The transport unit 36 transports the battery 101 stored in the storage 100*b* toward the battery mounting table 34. Specifically, in the underfloor area 100*c*, a temporary placement site 40 for temporarily placing the charged battery 101 stored in the storage 100*b* is provided, and the transport unit 36 can transport the battery 101 from the temporary placement site 40 toward the battery mounting table 34. The transport unit 36 may be of a belt conveyor type, for example.

(Battery Replacement Method)

Next, a battery replacement method using the battery replacement apparatus 100 will be described.

[Transmit Vehicle Information and the Like: Electrically Powered Vehicle]

First, the electrically powered vehicle 200 transmits information about the electrically powered vehicle 200 and information about the battery 201 to the communication unit 13 of the battery replacement apparatus 100. For example, when an operation of transmitting the above information is performed in a navigation system (not shown) of the electrically powered vehicle 200, the above information is transmitted to the communication unit 13. The electrically powered vehicle 200 transmits the above information before entering the battery replacement apparatus 100. The above information may be transmitted after the electrically powered vehicle 200 has entered the battery replacement apparatus 100.

[Acquire Vehicle Information and the Like: Battery Replacement Apparatus]

Next, the communication unit 13 of the battery replacement apparatus 100 acquires information on the electrically powered vehicle 200 and information on the battery 201 transmitted from the electrically powered vehicle 200 by communication. The acquired information is stored in the memory 12 (see FIG. 1).

The communication unit 13 may also acquire information on the capacity (charge capacity) of the battery 201 and the SOC (State Of Charge) of the battery 201.

[Transmit Instruction Signal for Battery Replacement Operation: Electrically Powered Vehicle]

Next, the electrically powered vehicle 200 stopped in the vehicle stop area transmits an instruction signal for starting the battery replacement operation to the communication unit 13.

[Receive Instruction Signal for Battery Replacement Operation: Battery Replacement Apparatus]

Next, the communication unit 13 receives the instruction signal transmitted from the electrically powered vehicle 200. After receiving the instruction signal, the processor 11 may transmit an instruction message or the like for turning off the ignition power supply to the user of the electrically powered vehicle 200 through the communication unit 13.

[Control Vehicle Position: Battery Replacement Apparatus]

Next, the processor 11 adjusts the position of the electrically powered vehicle 200 based on the information (vehicle information and battery information) acquired through the communication unit 13.

Thus, the position and orientation of the vehicle body 200*a* in the horizontal direction are adjusted, and the position and orientation of the battery 201 in the horizontal direction are adjusted. As a result, the battery 201 is moved to a predetermined position above the opening of the shutter 32.

[Detach Battery after Use: Battery Replacement Apparatus]

Next, the battery 201 after use is detached from the vehicle body 200*a* of the electrically powered vehicle 200. First, the processor 11 opens the shutter 32 and raises the battery mounting table 34. As a result, the battery mounting table 34 is positioned with respect to the electrically powered vehicle 200 (battery 201).

Next, the processor 11 drives (rotates) a locking/unlocking tool (not shown) for rotating a fastening member for connecting the battery to the mounting portion 200*c*. Thereby, the fastening member is unlocked. As a result, the battery 201 is detached from the vehicle body 200*a* and mounted on the battery mounting table 34.

[Transport Battery after Use to Storage: Battery Replacement Apparatus]

Next, the battery 201 removed from the vehicle body 200a is conveyed to the storage 100b. First, the processor 11 lowers the battery mounting table 34 on which the battery 201 is mounted to the height position of the transport unit 36. Subsequently, the processor 11 drives a roller portion (not shown) of the battery mounting table 34 so that the battery 201 moves in the storage direction (Y1 direction) on the battery mounting table 34. Thus, the battery 201 mounted on the battery mounting table 34 moves from the battery mounting table 34 to the transport unit 36. The battery 201 is transported to the temporary placement site 40 by the transport unit 36, and then stored in the storage 100b. The used battery 201 stored in the storage 100b is charged by the charging facility 51, and then the cover 106 is attached to the battery-side connector 104.

[Transport Charged Battery to Battery Mounting Table: Battery Replacement Apparatus]

Next, the processor 11 conveys the charged battery 101 stored in the storage 100b to the battery mounting table 34. Specifically, after the processor 11 conveys the battery 101 from the storage 100b to the temporary placement site 40 in the underfloor area 100c, the processor 11 moves the battery 101 from the temporary placement site 40 to the battery mounting table 34 by driving the transport unit 36 in the transport direction (Y2 direction). When the battery 101 moves from the transport unit 36 to the battery mounting table 34, the processor 11 drives the roller portion so that the battery 101 moves on the battery mounting table 34 along the transport direction. As a result, the battery 101 stops at a predetermined position on the battery mounting table 34.

[Attach Charged Battery: Battery Replacement Apparatus]

Next, the processor 11 performs control for attaching the charged battery 101 to the vehicle body 200a. Specifically, the processor 11 raises the battery mounting table 34. In this state, the processor 11 drives (rotates) the locking/unlocking tool. Thereby, the fastening member is locked. When it is detected that all the fastening members are locked, the vehicle body-side connector 204 and the battery-side connector 104 are locked. As a result, attachment of the charged battery 101 to the vehicle body 200a is completed.

[Retract Battery Mounting Table and Raising/Lowering Unit: Battery Replacement Apparatus]

Next, the processor 11 lowers the battery mounting table 34 and retracts the battery mounting table 34 from the electrically powered vehicle 200. Thereafter, the processor 11 closes the shutter 32.

[Notification of Completion of Battery Replacement Operation: Battery Replacement Apparatus]

Next, the processor 11 notifies the electrically powered vehicle 200 of the completion of the battery replacement operation through the communication unit 13.

[Receive the Battery Replacement Operation Completion Notification: Electrically Powered Vehicle]

Then, the electrically powered vehicle 200 receives the notification transmitted from the communication unit 13 of the battery replacement apparatus 100. Thus, the electrically powered vehicle 200 is brought into a state in which the ignition power supply can be turned on. Thereafter, the process ends.

In the above embodiment, the position of the drive device 30 is adjusted based on the information about each of the electrically powered vehicle 200 and the battery 201, but the present disclosure is not limited thereto. The position of the drive device 30 may be adjusted based on information about either the electrically powered vehicle 200 or the battery 201.

As described above, in the electrically powered vehicle 200 according to the present embodiment, since the battery-side connector 104 is protected by the cover 106, adhesion of foreign matter to the battery-side connector 104 when the battery-side connector 104 is exposed to the outside is suppressed.

Figure 4:
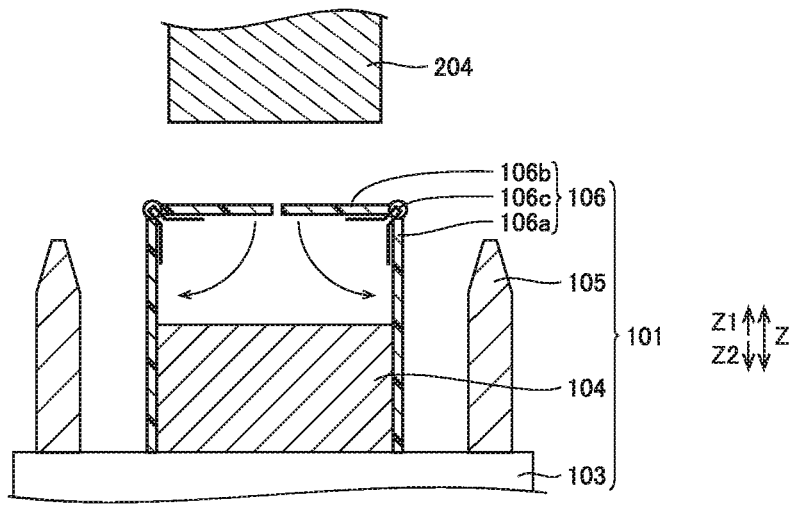
FIG. 4 is a cross-sectional view schematically showing a modification of the cover.

In the above embodiment, as shown in FIG. 4, the cover 106 may include a peripheral wall 106a, a lid portion 106b, and a biasing portion 106c.

The peripheral wall 106a surrounds the periphery of the battery-side connector 104 and opens upward.

The lid portion 106b is connected to the upper end of the peripheral wall 106a and has a shape that closes the opening of the peripheral wall 106a. The lid portion 106b is movable relative to the peripheral wall 106a between a close position (the position shown in FIG. 4) in which the lid portion 106b closes the opening of the peripheral wall 106a and an open position in which the lid portion 106b opens the opening of the peripheral wall 106a. As indicated by arrows in FIG. 4, the lid portion 106b is rotatably connected to the upper end of the peripheral wall 106a by a hinge. The lid portion 106b may be configured to be slidable in a direction orthogonal to the fitting direction with respect to the peripheral wall 106a.

The biasing portion 106c biases the lid portion 106b. Specifically, the biasing portion 106c biases the lid portion 106b so that the lid portion 106b assumes the close position. The biasing portion 106c may be configured by a torsion spring attached to a hinge, for example.

In the example shown in FIG. 4, the cover 106 illustrated in the above embodiment may be added to the surface of the battery-side connector 104.

It will be appreciated by those skilled in the art that the exemplary embodiments described above are specific examples of the aspects described below.

[Aspect 1]

A vehicle including:

a vehicle body on which a battery is mountable; and the battery attachable to and detachable from the vehicle body, wherein the battery includes:

a battery-side connector; and a cover that protects the battery-side connector, the vehicle body includes a vehicle body-side connector electrically connectable to the battery-side connector, and the cover exposes the battery-side connector when the battery-side connector is fit to the vehicle body-side connector in a fitting direction in which the vehicle body-side connector and the battery-side connector are fit to each other.

In this vehicle, the battery-side connector is protected by the cover, and therefore, adhesion of foreign matter to the battery-side connector when the battery-side connector is exposed to the outside is suppressed.

[Aspect 2]

The vehicle according to Aspect 1, wherein the cover includes a sheet that covers a surface of the battery-side connector.

In this aspect, adhesion of foreign matter to the battery-side connector is more reliably suppressed.

[Aspect 3]

The vehicle according to Aspect 1 or 2, wherein the cover includes:

a peripheral wall surrounding a periphery of the battery-side connector and having a shape that opens upward;

a lid portion connected to an upper end of the peripheral wall and having a shape that closes an opening of the peripheral wall; and a biasing portion that biases the lid portion, the lid portion is movable, relative to the peripheral wall, between a close position in which the lid portion closes the opening of the peripheral wall, and an open position in which the lid portion opens the opening of the peripheral wall, and the biasing portion biases the lid portion such that the lid portion assumes the close position.

In this aspect, entry of foreign matter into the peripheral wall is suppressed by the lid portion, and therefore, adhesion of foreign matter to the battery-side connector is effectively suppressed.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:

a vehicle body on which a battery is mountable; and the battery attachable to and detachable from the vehicle body, wherein the battery includes:

a battery body:

a battery-side connector projecting upward from the battery body;

a cover that protects the battery-side connector, the cover including a sheet that covers a surface of the battery-side connector; and a pair of fitting pins disposed on the side of the battery-side connector and projecting upward from the battery body, the vehicle body includes a vehicle body-side connector electrically connectable to the battery-side connector, the vehicle body-side connector pierces through the sheet of the cover and exposes the battery-side connector when the battery-side connector is fit to the vehicle body-side connector in a fitting direction in which the vehicle body-side connector and the battery-side connector are fit to each other, and an upper end of each of the fitting pins is located higher than the sheet.

2. A vehicle comprising:

a vehicle body on which a battery is mountable; and the battery attachable to and detachable from the vehicle body, wherein the battery includes:

a battery body;

a battery-side connector projecting upward from the battery body;

a cover that protects the battery-side connector; and a pair of fitting pins disposed on the side of the battery-side connector and projecting upward from the battery body, the vehicle body includes a vehicle body-side connector electrically connectable to the battery-side connector, and the cover exposes the battery-side connector when the battery-side connector is fit to the vehicle body-side connector in a fitting direction in which the vehicle bodyside connector and the battery-side connector are fit to each other, wherein the cover includes:

a peripheral wall surrounding a periphery of the battery-side connector and having a shape that opens upward;

a lid portion connected to an upper end of the peripheral wall and having a shape that closes an opening of the peripheral wall; and a biasing portion that biases the lid portion, the lid portion is movable, relative to the peripheral wall, between a closed position in which the lid portion closes the opening of the peripheral wall, and an open position in which the lid portion opens the opening of the peripheral wall, the biasing portion biases the lid portion such that the lid portion assumes the closed position, and the lid portion is provided at a position higher than an upper end portions of each of the fitting pins.

* * * * *